United States Patent Office 3,701,794
Patented Oct. 31, 1972

3,701,794
METHOD FOR PREPARING 10-CHLOROPHENOXARSINE
Robert C. Wade, Ipswich, Mass., assignor to Ventron Corporation, Beverly, Mass.
No Drawing. Filed July 23, 1971, Ser. No. 165,749
Int. Cl. C07d 105/06
U.S. Cl. 260—440  2 Claims

ABSTRACT OF THE DISCLOSURE 10-chlorophenoxarsine is prepared by reacting a mixture of arsenic trioxide, anhydrous aluminum trichloride and diphenyl ether, the latter being in an amount between about 50 and 200 percent in excess of the stoichiometric amount, while agitating and heating the reaction mixture at a temperature between about 175° C. and about 260° C. until hydrogen chloride ceases to be evolved. Thereafter, the insoluble by-products are removed and the 10-chlorophenoxarsine is isolated from the excess diphenyl ether.

---

10-chlorophenoxarsine,

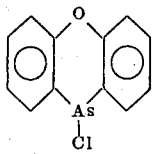

has been prepared on a commercial scale and its main use is as an intermediate to prepare 10,10′-oxybisphenoxarsine.

(1)
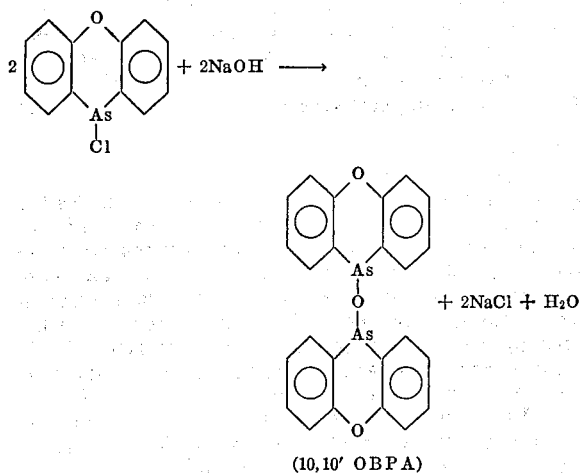

(10,10′ OBPA)

The latter product is extremely useful as a biocide in paints, plastics, rubber and the like.

Previous processes (U.S. Pat. 3,371,105) for the preparation of 10-chlorophenoxarsine have been based on the reaction of arsenic trichloride and an excess of diphenyl ether catalyzed by 1–5% of anhydrous aluminum trichloride or tribromide and at a temperature of not less than 240° C.

(2)
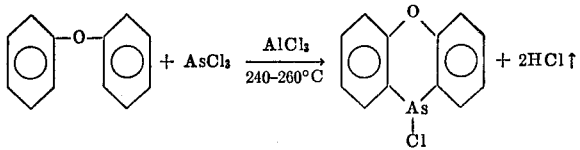

This process suffers from several deficiencies when practiced on an industrial scale. First arsenic trichloride is not a readily available item of commerce, therefore it must be especially prepared for use in this process. Secondly, it is necessary to maintain exceedingly close control over the rate of addition of arsenic trichloride to the hot diphenyl ether-aluminum trichloride mixture. If the arsenic trichloride (B.P.=130.2° C.) is added at a rate more rapid than it is reacted, the excess arsenic trichloride refluxes and lowers the temperature in the reactor to below 240° C. This, in turn, further slows down the rate of reaction and very quickly the reaction stops. The reaction is very sensitive to trace amounts of moisture. Unless all of the reagents are kept dry, the rate of reaction becomes very slow. Furthermore, side reactions occur which generate tarry materials. The longer the reaction takes to complete, the more tarry materials are formed. It is very difficult to separate the desired pure 10-chlorophenoxarsine from these tarry materials.

I have now discovered a new method of synthesizing 10-chlorophenoxarsine which overcomes the deficiencies of the prior process. My discovery is based on the completely unexpected fact that arsenic trioxide will react with a stoichiometric amount of aluminum trichloride in an excess of diphenyl ether at 175–260° C. to form 10-chlorophenoxarsine in good yield.

(3)
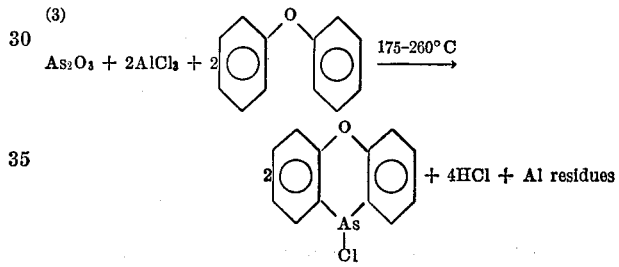

Attempts to prepare arsenic trichloride from arsenic trioxide and aluminum trichloride in the absence of diphenyl ether at temperatures up to 180° C., the sublimation temperature of $AlCl_3$, have failed. Therefore, it was very surprising to find that arsenic trioxide reacts with a solution or suspension of aluminum trichloride in diphenyl ether at room temperature to form a complex reaction product with the evolution of considerable heat. Further heating of this complex to a temperature between 175 and 260° C. results in the rapid evolution of HCl and the formation of 10-chlorophenoxarsine in good yield. The following advantages to this process are immediately apparent:

(1) Arsenic trioxide of high purity is a readily available item of commerce at low cost and can be used without any other processing.

(2) All of the reagents can be charged at once to the reactor at room temperature.

(3) Minor amounts of water can be tolerated and, indeed, the elements of water exist in the reaction medium. For example at least *trace* amounts of water can be present at all times from the reactions:

$6HCl + As_2O_3 \rightarrow 2AsCl_3 + 3H_2O$
$6HCl + Al_2O_3 \rightarrow 2AsCl_3 + 3H_2O$

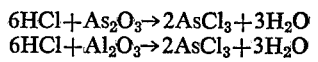

(4) The major part of the reaction takes place at temperatures considerably below 240° C., therefore far less tarry material forms.

(5) After the reaction has started, almost no attention is required by operators until the reaction is complete.

(6) Extremely high purity 10-chlorophenoxarsine is produced with very little tarry material formed.

PREFERRED EMBODIMENTS OF PRESENT INVENTION

The reaction of arsenic trioxide with a 1-5% excess of the stoichiometric amount of anhydrous aluminum trichloride in at least a 50% excess of diphenyl ether over the stoichiometric amount required at room temperature produces a strong exotherm of from 40-90° C. and the formation of a complex of unknown composition. In the temperature range of 105-145° C. this complex becomes very viscous—and in some cases, rubbery. Good agitation with high shear is very desirable at this stage. As the temperature is raised beyond 150° C., the viscosity of the mixture decreases. The desired reaction to form 10-chlorophenoxarsine will begin between a temperature of 175 and 195° C. This is apparent by the rapid evolution of HCl and rapid reflux of the reaction medium. HCl is trapped in water as it passes out of the condenser. The reaction temperature slowly increases until it reaches 260° C. By far the greater part of the reaction is completed at 200-240° C., which is well below that specified in U.S. Pat. 3,371,105.

While any order of addition of the reagents may be used, I prefer to charge the reactor first with the diphenyl ether, then with anhydrous aluminum chloride and finally with the arsenic trioxide. Aluminum chloride dissolves rapidly in diphenyl ether, but it is not necessary to wait for it to dissolve completely before adding the arsenic trioxide. After the diphenyl ether has been charged, I prefer to start the agitator then charge the anhydrous aluminum chloride, and, finally the arsenic trioxide. Agitation should be sufficient to ensure uniform mixing of the reagents. With very vigorous agitation during the reaction it is possible to carry out the desired reaction in good yield with only a 50% excess of diphenyl ether over stoichiometry. However I prefer to use 100-200% excess of this reagent which acts as a solvent for the reaction and the reaction product 10-chlorophenoxarsine. It is easily recovered and may be subsequently reused.

At the completion of the reaction, the reaction mixture is cooled to a suitable temperautre and filtered or centrifuged to remove the insoluble byproducts. The 10-chlorophenoxarsine may then be recovered by allowing it to craystallize from the diphenyl ether solvent or by distilling the diphenyl ether away from the 10-chlorophenoxarsine.

My invention is further illustrated by the following specific examples.

EXAMPLE I

A two liter flask fitted with a stirrer, reflux condenser, nitrogen inlet and heated with an electric heating mantle was set up. A water scrubber for trapping HCl was attached to the condenser. The flask was charged in the order listed with:

Diphenyl ether 4 moles=680.8 g. (100% excess)
$AlCl_3$ 2.08 moles=278.9 g. (4% excess)
$As_2O_3$ 1.00 mole=197.2 g.

When the $As_2O_3$ was added, the mixture turned a deep reddish black color and the temperature rose from 30° C. to about 100° C. Heating and stirring were continued and at 110° C. the mixture became very viscous and almost rubbery. At 145-150° C. the mixture began to thin out. At 179° C. HCl began to come off and the reaction mixture began to reflux. The reaction continued at a rapid rate for 12 hours when the temperature finally reached 260° C. The reaction mixture was cooled to 40° C. diluted with methylene chloride and filtered to remove insoluble byproducts. The methylene chloride was then stripped from the filtrate and 10-chlorophenoxarsine allowed to crystallize out. These crystals were removed by filtration and washed with heptane. The filtrate diphenyl ether distilled. The residue contained additional 10-chlorophenoxarsine. Total HCl evolved was 71% of theory. Total 10-chlorophenoxarsine recovered was 68% theory.

EXAMPLE II

Using the same general procedure described in Example I a reaction was carried out using a 200% excess of diphenyl ether as reagent and reaction solvent. The reaction mixture was much less viscous in the temperature range of 115-150° C. The reaction began to evolve HCl at about 180° C. and was complete after seven hours when the temperature was 259° C. The reaction mixture was filtered at 70-80° C. to remove insoluble byproducts. The precipitate was washed with perchloroethylene. The filtrate was distilled to remove perchloroethylene and unreacted diphenyl ether. 10-chlorophenoxarsine yield was 65% based on $As_2O_3$.

EXAMPLE III

Using the same general procedure described in the previous examples, a reaction was carried out using a 50% excess of diphenyl ether as reagent and reaction solvent. The reagents used were:

|  | Moles | Grams |
| --- | --- | --- |
| Diphenyl ether | 3.00 | 510 |
| $AlCl_3$ | 2.08 | 278 |
| $As_2O_3$ | 1.00 | 197.2 |

When $As_2O_3$ was added the temperature rose 70° C. over a period of 5 minutes. At 107° C. the reaction mixture became a very viscous semi-rigid gel. With vigorous agitation however this gel was kept moving and when the temperature reached 150-160° C. the complex began to break up and the mixture thinned out considerably. HCl began to come off at 180° C. The reaction was shut down when the temperature reached 260° C. and almost no more HCl was being evolved. The reaction mixture was cooled, diluted with perchloroethylene and filtered. 10-chlorophenoxarsine was isolated by previously described techniques. HCl evolved was 82.5% of theory. 10-chlorophenoxarsine isolated was 71% of theory.

I claim:

1. The method for preparing 10-chlorophenoxarsine which comprises mixing arsenic trioxide with at least a stoichiometric amount of anhydrous aluminum trichloride in an amount of diphenyl ether between about 50 and about 200 percent in excess of the stoichiometric amount, and heating the reaction mixture to a temperature between about 175° C. to about 260° C. while agitating the reaction mixture until hydrogen chloride ceases to be evolved, and recovering the 10-chlorophenoxarsine from the reaction mixture.

2. The method as claimed by claim 1 wherein the amount of aluminum trichloride is from about 1 to about 5 percent in excess of the stoichiometric amount.

References Cited

UNITED STATES PATENTS

| 3,532,727 | 10/1970 | Wang et al. | 260—440 |
| 3,371,105 | 2/1968 | McGee | 260—440 |
| 2,767,114 | 10/1956 | Urbschat et al. | 260—440 |

JAMES E. POER, Primary Examiner

W. F. W. BELLAMY, Assistant Examiner